Jan. 24, 1967    F. PERNACK ETAL    3,299,577
METHOD AND APPARATUS FOR TRIMMING GRINDING WHEELS
Filed April 14, 1964    2 Sheets-Sheet 1
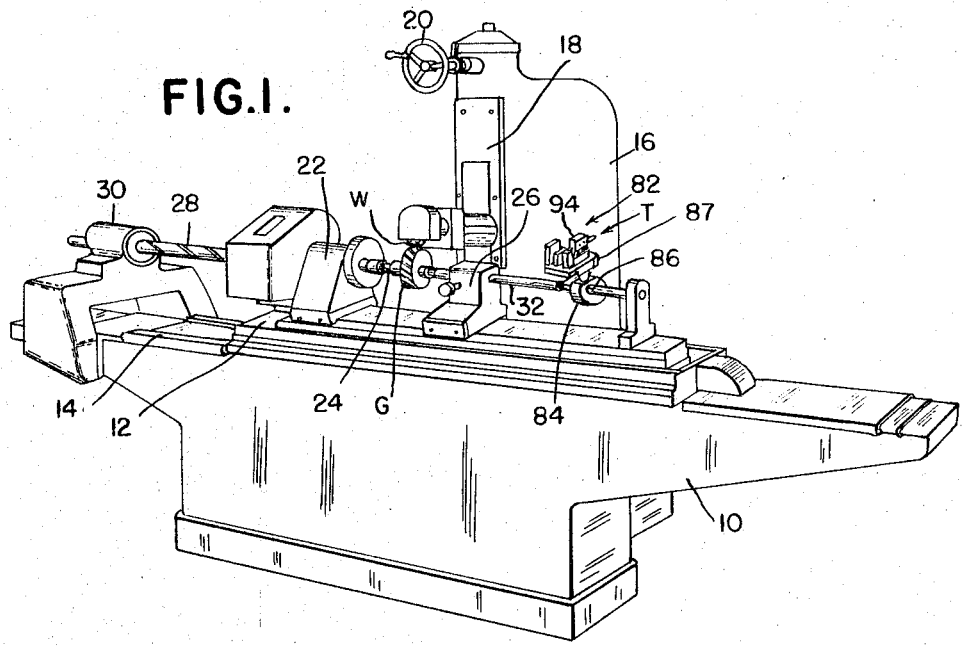
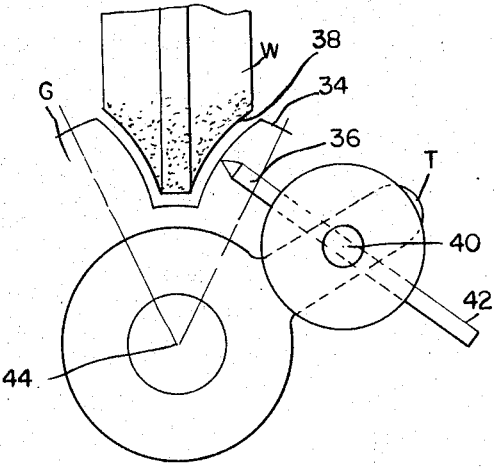
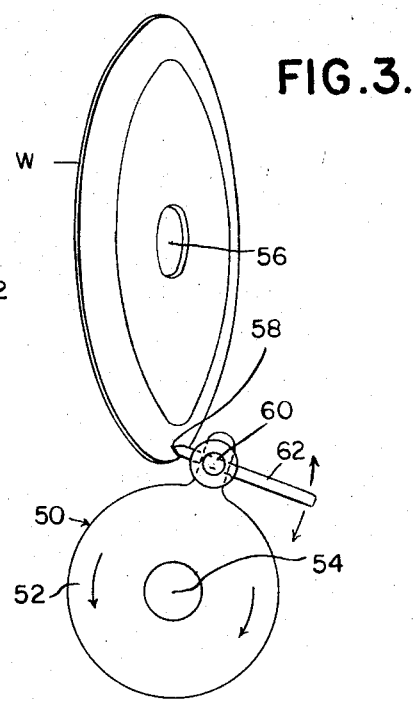
INVENTORS
FRANK PERNACK
STEWART F. MILLER
EDWARD Z. KRYGIER
BY AXEL B. ABRAHAMSSON
Whittemore, Hulbert
& Belknap ATTORNEYS Jan. 24, 1967  F. PERNACK ETAL  3,299,577
METHOD AND APPARATUS FOR TRIMMING GRINDING WHEELS
Filed April 14, 1964  2 Sheets-Sheet 2
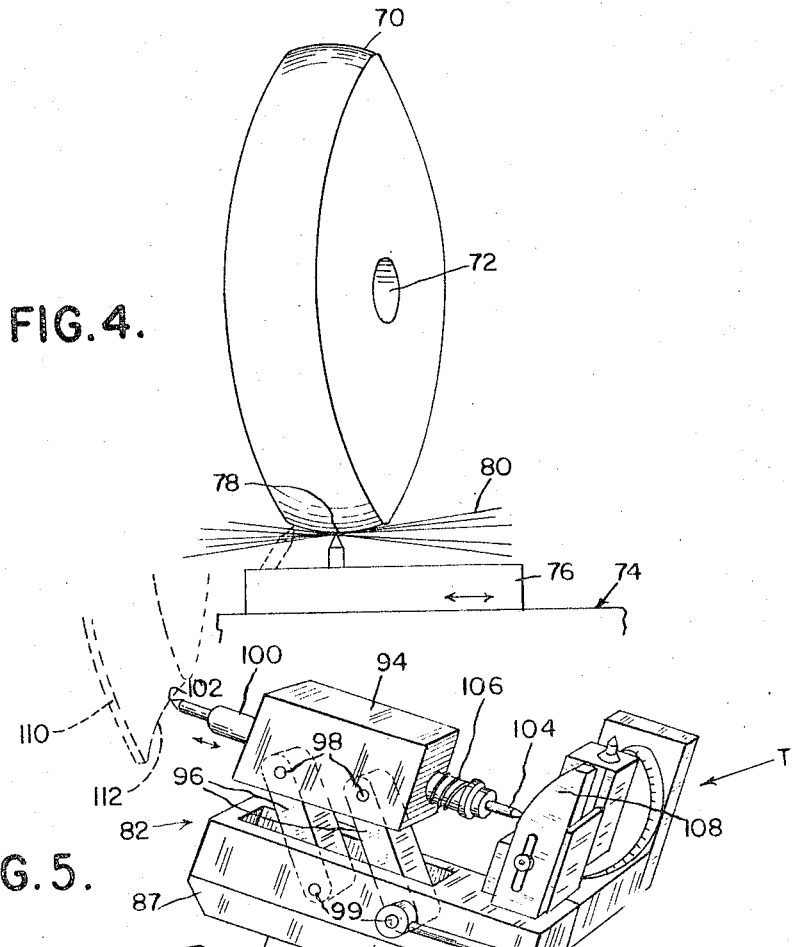
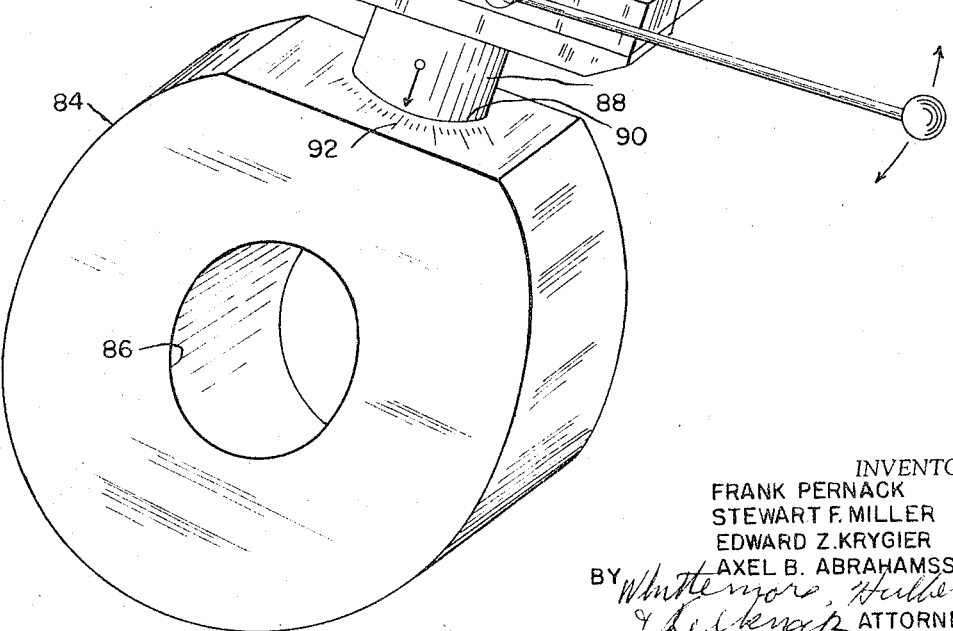
INVENTORS
FRANK PERNACK
STEWART F. MILLER
EDWARD Z. KRYGIER
AXEL B. ABRAHAMSSON
BY Whittemore, Hulbert
& Belknap ATTORNEYS

United States Patent Office 3,299,577
Patented Jan. 24, 1967

3,299,577
METHOD AND APPARATUS FOR TRIMMING GRINDING WHEELS
Frank Pernack, Birmingham, Stewart F. Miller, Roseville, Edward Z. Krygier, Royal Oak, and Axel B. Abrahamsson, Warren, Mich., assignors to National Broach & Machine Company, Detroit, Mich., a corporation of Michigan
Filed Apr. 14, 1964, Ser. No. 359,686
5 Claims. (Cl. 51—5)

The present invention relates to apparatus for trimming grinding wheels.

It is an object of the present invention to provide an apparatus for trimming a grinding wheel by an operation in which the path of the trimming element corresponds substantially exactly to elements on a helicoidal surface ground by the wheel.

It is a further object of the present invention to provide an apparatus for trimming a grinding wheel used in form grinding of helicoidal surfaces in which a trimming element is moved repeatedly back and forth in a path corresponding to a shape to be produced by grinding on a work piece while relative movement between the grinding wheel and the plane containing the path of movement of the trimming element is caused to take place in a direction parallel to the axis of the work piece.

More specifically, it is an object of the present invention to provide apparatus in which trimming mechanism is mounted on a grinder with provision for helical movement thereon about the axis of a work piece.

It is a further object of the present invention to provide apparatus as set forth in the previous paragraph in which the trimming mechanism includes a trimming element movable back and forth in a path transverse to the helical path of movement of the trimming mechanism.

More specifically, it is an object of the present invention to provide on a form grinder a trimming mechanism movable relative to the periphery of a grinding wheel along a helical path substantially identical with helical movement of a work piece relative to the grinding wheel, the trimming mechanism including a trimming element movable in a curved path conforming to the curvature of an element of a helicoidal surface formed by grinding on the work piece.

It is a further object of the present invention to provide a grinder having trimming mechanism mounted thereon for movement in a helical path relative to a grinding wheel, the trimming mechanism including a templet for providing movement of a trimming element relative to the trimming mechanism.

It is a further object of the present invention to provide, in a grinder having an adjustable support for mounting a grinding wheel for rotation, a slide movable in a straight line relative to the grinding wheel, work support means on the slide including means for effecting controlled rotation of a work piece in timed relation to axial advance thereof, a trimmer on the slide, means for effecting rotary movement of the trimmer about the axis of the work support in timed relation to movement of the slide, said trimmer including a trimming element movable in a plane intersecting the axis of the work support.

It is a further object of the present invention to provide apparatus as described in the preceding paragraph including means for effecting adjustment of the trimmer to adjust the angularity of the plane of movement of the trimming element with reference to the axis of the work support.

Other objects and features of the invention will become apparent as the description proceeds, especially when taken in conjunction with the accompanying drawings, illustrating a preferred embodiment of the invention, wherein:

FIGURE 1 is a schematic perspective view of a grinder incorporating the present invention.

FIGURE 2 is a diagrammatic view illustrating the relationship between the trimmer and grinding wheel.

FIGURE 3 is a diagrammatic view similar to FIGURE 2, illustrating the use of the trimmer in conjunction with a wheel set to an oblique angle.

FIGURE 4 is a diagrammatic view illustrating trimming of a grinding wheel to produce a helicoidal surface on a work piece having transverse straight line elements.

FIGURE 5 is a fragmentary perspective view illustrating the relationship between the trimmer mounting and the grinding wheel.

While the present invention finds its greatest field of utility in grinding gears or splines, in its broader aspect it is not so limited and may find utility in forming helicoidal surfaces on any work piece. However, the present disclosure for the most part will be limited to a description of the invention as applied to a gear grinding machine, and more particularly, a machine for grinding helical gears.

In general, the teeth of the helical gears may be ground by a generating operation in which the gear is in effect rolled relative to a flat or conical surface of a grinding wheel, thus generating an involute or modified involute surface. Alternatively, the tooth surface of helical gears may be accurately ground by a form grinding operation in which one or both sides of the edge portion of a grinding wheel is or are trimmed to a concave curvature and the gear advanced axially so that the edge portion of the grinding wheel traverses a tooth space of the gear. The operation may be performed in an on-center operation in which opposite edge portions of the wheel are trimmed and confronting surfaces of adjacent teeth are ground simultaneously. However, it is preferred to grind only a single tooth surface at a time, and better results are obtained when the grinding operation takes place off-center so as to avoid the presence of grinding surfaces on the wheel which are parallel to the plane of rotation of the wheel.

As is well understood, if a spur gear is ground, the edge portion of the grinding wheel may be trimmed to the exact cross-sectional contour of the tooth surface. However, where the grinding operation is provided for a helical gear, heel and toe interference results in the formation of a tooth surface on the gear which differs materially from the cross-sectional configuration of the active portion of the grinding wheel. Moreover, this variation between the shape of the surface of the tooth on the gear and the shape of the effective surface of the grinding wheel is a function of wheel diameter so that as the wheel wears, there must be a change in the shape of the trimmed area to maintain accurate results on the gear.

Although gear teeth may be of many different forms, including circular arcs, the most common form of tooth in use today is involute and equipment is available for measuring involute surfaces with great accuracy. These involute checkers operate to measure the tooth surface in the plane of rotation of the gear, which is referred to herein as the transverse plane. It is of course apparent that this transverse plane extends obliquely through a helical tooth although it is of course normal to a spur tooth.

In accordance with the present invention the mechanism for trimming the active surface of the grinding wheel is mounted for combined angular and longitudinal movement so that in effect the trimmer as a whole is caused to move in a helical path coaxial with the work support. The trimmer includes means for effecting back and forth movement of a trimming element as the trimmer as a whole moves in the helical path. This movement of the trimming element is, as in the case of a wheel being trimmed for grinding involute gears, a movement in an involute path occupying a plane which extends perpendicular to the axis of the helical advance of the trimmer which of course is also perpendicular to the axis of the work.

In general terms, the trimmer may be set so that the plane of movement of its trimming element is perpendicular to the axis of the work gear. Alternatively, it may be adjusted so that its plane of movement in mid-position is occupied by the axis of the grinding wheel. This is referred to as the normal plane. In accordance with the present invention, the trimmer may be adjusted to any convenient plane and will result in the reproduction of a helicoidal surface on the work piece which is identical with the path of movement of the trimming element in its own plane as checked in the corresponding plane. In other words, if the trimmer is set to occupy the transverse plane perpendicular to the axis of the gear while the trimmer is of course set around to the approximate helix angle of the gear, the wheel will be trimmed to a configuration which will produce on the work piece helicoidal surfaces which when checked in the transverse plane perpendicular to its axis are identical with the path of movement of the trimming element in its own plane. Similarly, if the trimmer is set around so that the plane containing the path of movement of the trimming element is perpendicular to the plane of the wheel, the wheel as thus trimmed will produce on the workpiece helicoidal surfaces which have a curvature when checked in the normal plane identical with the curvature of the path of movement of the trimming element in its own plane.

The foregoing represents a very important advance in the art since it now becomes possible to provide a trimmer which automatically trims the peripheral trimming portion of a grinding wheel to the proper configuration to produce a tooth surface which when checked in the usual manner in the transverse plane is identical with the path of movement of the trimming element, completely independent of the diameter of the grinding wheel. This permits formation of a templet to an exact known desired shape for use in the trimmer. It further provides for simpler set-up and adjustment of a trimmer where it is desired to produce tooth surfaces arcuate in cross-section in the transverse plane, such tooth surfaces being familiar in gearing known as Novacoff gearing.

With the foregoing general description in mind reference is now made to FIGURE 1, which illustrates a helical gear grinder comprising an elongated bed 10 on which is mounted a slide or table 12 for reciprocation longitudinally of the bed 10 on rectilinear ways indicated at 14. Intermediate the ends of the bed 10 and at one side thereof is a column 16 which is mounted for angular adjustment about a vertical axis by conventional means (not shown), the vertical axis extending substantially centrally through the grinding wheel W. The wheel W is mounted on a slide 18 capable of vertical adjustment by suitable means such as the hand wheel 20, and is adapted to be driven in rotation at grinding speeds by a motor suitably mounted within the column 16. Mounted on the table 12 is a headstock 22 which includes conventional indexing mechanism (not shown) and which is adapted to receive an arbor or the shaft 24 of a helical work gear G, the other end of the arbor or shaft being mounted in a tailstock 26.

In order to provide for helical advance of the gear G as the table is moved to cause the gear to move back and forth below the grinding wheel W, suitable mechanism is provided which may take the form of a lead bar 28 coupled to the shaft or arbor 24 and movable through a fixed nut 30 so that rotation is imparted to the gear G in timed relation to its axial advance. It will be appreciated that the column 16 is angularly adjusted to cause the grinding wheel to occupy the appropriate inclined plane in accordance with the helix angle of the gear G.

Means are provided for trimming the grinding wheel so as to produce the required tooth surface on the teeth of the work gear G and this trimming mechanism is indicated generally at T. In FIGURE 1 the trimmer is illustrated as mounted on a shaft or arbor 32 coupled for rotation with the shaft or arbor 24 so that as the table 12 is reciprocated the lead bar and nut 28, 30 imparts rotation to the trimmer so that it is caused to have identical helical movement as is imparted to the work gear during the grinding operation. It will of course be apparent that in order to trim the wheel W, the table 12 is traversed to the left a distance sufficient to bring the trimming mechanism into a position adjacent the lower periphery of the grinding wheel.

Referring now to FIGURE 2 there is illustrated diagramatically the geometrical relationship between a tooth 34 of a work gear G, the trimming element 36 of the trimmer T, and the edge or peripheral portion of a grinding wheel W. It may be assumed for the purpose of discussion in connection with FIGURE 2 that the work gear G is a spur gear and that its teeth 34 have tooth surfaces which are true arcs in the transverse plane. This assumption is reasonable since involute surfaces closely approximate arcs and in some cases an arc is a close enough approximation of an involute for practical purposes. In FIGURE 2 it will be observed that the trimming point of the element 36 follows the identical arcuate curvature of a flank or profile of the tooth 34 and that this curvature corresponds exactly to the concave trimmed surface 38 of the grinding wheel W. If the wheel is adjusted downwardly and to the right as seen in this figure, until its surface contacts the point of the trimming element 36, while the trimming element is caused to pivot about the axis 40 by means of a handle 42, the periphery of the grinding wheel will be trimmed to have a shape in radial cross-section conforming exactly to the cross-sectional shape of the gear tooth 34 as measured in the transverse plane perpendicular to its axis, which in the case of the spur gear illustrated in FIGURE 2, is also perpendicular to the tooth and hence is the normal plane.

With the grinding wheel then set with its axis perpendicular to the axis 44 of the gear, the gear may be reciprocated back and forth and the surface 38 of the wheel will produce on the tooth 34 a profile conforming exactly to the cross-sectional shape of the wheel surface 38. If however, the gear is a helical gear, the wheel will be set around so that its axis extends in angular relation to the axis of the gear by an amount corresponding generally to the helix angle. Thus, for a 30° helix gear the axis of the wheel will be inclined to the axis of the gear at an angle of approximately 60°. In order to trim a helicoidal surface on the gear tooth, the gear is rotated as it is advanced. The result of a grinding action carried out in this manner is heel and toe interference which will produce a shape on the gear tooth, as measured in the transverse plane, which is substantially different from the shape of the surface 38 on the grinding wheel.

In accordance with the present invention it is possible to provide a simple trimming operation for the wheel W as indicated in FIGURE 3. This is accomplished by mounting the trimmer, here designated 50, on a support body 52 having an axis of rotation 54 and being movable bodily along the axis of rotation. This mechanism may be of the type illustrated in FIGURE 1 in which the trimming mechanism is mounted on a table such as the Table 12, and is provided with lead bar or sine bar mechanism for effecting rotation in accordance with axial reciprocation.

In FIGURE 3 it will be observed that the wheel W has been set around so that its axis, here designated 56, extends at an oblique angle to the axis of rotation of the trimmer and work gear, here designated 54. In this figure there is illustrated a simplified trimmer having a trimming point 58 movable in an arc about an axis 60 and adapted to be swung in such arc by a handle 62.

With this arrangement the wheel is trimmed by an operation in which the trimmer 50 is moved in a helical path, rotating about its axis 54 in accordance with the lead of the work gear. During its helical advance the handle 62 is repeatedly swung so as to cause the trimming point 58 to trace a multiplicity of paths all of which are arcuate in the transverse plane of the paper, but which are helically spaced. The result is that the complete surface traced by the trimming point is a helicoidal surface having precisely the same configuration as the helicoidal surface on the work gear. Thus, if the helicoidal surface of the gear tooth is checked in the transverse plane, it will indicate the same curvature as the path of movement of the trimming point 58 in the transverse plane. Specifically, by way of example, if the distance of the trimming point 58 is .500″ from the pivot axis 60, and if the wheel is trimmed as illustrated, and thereafter a surface of a gear tooth is ground by such surface of the wheel, the ground tooth surface will have an arcuate curvature of .500″ as measured in the transverse plane perpendicular to its axis.

Referring now to FIGURE 4 there is illustrated an extension of the concept. In this figure there is illustrated a grinding wheel 70 whose axis 72 is inclined at an oblique angle to the direction of traverse of a work piece, which in this instance is assumed to be perpendicular to the plane of the figure. In this case the O.D. of the wheel is trimmed by a trimmer 74 which again is mounted for movement in a helical path about the axis of a work piece to be ground. In this case the trimmer includes a block 76 movable transversely in a straight line as indicated in the figure and having a diamond or trimming point 78 adapted to trim the O.D. of the wheel. As the trimmer 74 is moved helically beneath the wheel 70 the diamond is caused to traverse a multiplicity of straight lines indicated at 80. The result will be that the O.D. of the wheel will be trimmed to a convex transverse curvature as illustrated, but when this wheel is used to grind a helicoidal surface on a work piece, the surface will be a helicoidal surface composed of a multiplicity of straight line elements parallel to the transverse plane of the work piece.

Referring now to FIGURE 5 there is illustrated a practical embodiment of the present invention. In this case the trimmer designated generally at 82 is mounted on a support 84 having means indicated at 86 for mounting it on a shaft on the grinder which may be helically moved in the manner of a shaft 32 as seen in FIGURE 1. The trimmer 82 includes a body 87 having a post 88 received in a circular opening 90 in the support 84 and may be angularly adjusted, suitable indicia indicated generally at 92 being provided to show the angular adjustment.

The trimmer 82 includes a block 94 connected by parallel arms 96 pivoted to the block at 98 and to the body 87 at 99. Mounted for longitudinal movement in the block 94 is an elongated slide 100 having a diamond or similar trimming element 102 at one end. The slide at its opposite end includes a templet follower 104 and a compression spring 106 is provided urging the slide 100 to the right as seen in FIGURE 5. Mounted on the body 87 is a templet 108 which may be of any desired form such for example as involute or modified involute form, which is fully adjustable as disclosed in Pernack et al. Patent No. 3,067,733. The spring 106 causes the follower 104 to maintain engagement with the form of the templet 108 and the diamond 102 moves in an identical path, since orientation of the block 94 in space is maintained by the parallel linkage.

In this figure it will be observed that the grinding wheel 110 is inclined from the axis about which the support 84 rotates as it is advanced in a helical path. The plane containing the path of movement of the diamond 102 in this instance is illustrated as perpendicular to the axis of rotation of the support 84. Accordingly, the wheel 110 is trimmed in a transverse plane and when the trimmed surface 112 is used to grind the helicoidal surface of a tooth of a helical gear, the gear tooth will have a helicoidal surface, all elements of which as measured in the transverse plane perpendicular to the axis of the gear will be of identical shape or form as the form on the templet 108.

With the mechanism illustrated in FIGURE 5, which is of course directly applicable to the grinder illustrated in FIGURE 1, it is possible to trim grinding wheels so as to produce helicoidal surfaces on a work piece which are identical with the surface of a templet, as measured in any desired plane with reference to the gear wheel. In practice, the trimmer will usually be set around to swing the diamond in planes perpendicular to the axis of the gear and this swinging movement of the diamond in combination with the helical advance of the trimmer as a whole, will produce a shape on the grinding wheel which will in turn produce the required shape on the work piece. It is further noted that in this case the curvature of the concave surface on the grinding wheel is different in radial cross-section from the path of the diamond but it is automatically brought to the configuration required to produce the desired shape on the helicoidal surface of the work piece.

While reference in the foregoing has been made to gear teeth of involute or circular arc form, it should also be noted that the present trimming operation is highly useful in trimming a grinding wheel used in the production of flat sided splines in which the sides may be parallel or angular.

The drawings and the foregoing specification constitute a description of the improved apparatus for trimming grinding wheels in such full, clear, concise and exact terms as to enable any person skilled in the art to practice the invention, the scope of which is indicated by the appended claims.

What we claim as our invention is:

1. A gear grinder comprising a base, a work slide on said base, means for reciprocating said slide, a rotary work support on said slide having its axis of rotation parallel to the direction of reciprocation thereof, means for rotating said work support in timed relation to axial movement thereof, a wheel support, means on said wheel support mounting a wheel for rotation about its axis and for angular adjustment about an axis radial of the work support axis, a trimmer, means mounting said trimmer on said slide for movement therewith parallel to the axis of said slide and for rotation about the axis of rotation of said work support, means for rotating said trimmer in timed relation to movement of said slide parallel to the axis of said work support, said trimmer comprising a templet, a follower movable over the templet, a diamond connected to said follower and movable in a path similar to the path of said follower, means for moving said follower and diamond to cause said diamond to move over a peripheral portion of the wheel in a direction generally radial thereof, and means for effecting limited movement of said trimmer along and around the axis of rotation of said work support to trace an imaginary helicoidal surface identical to the required tooth surface and thus to form the peripheral portion of said wheel to a radial cross-section different from the cross-section of a gear tooth in a plane perpendicular to the axis of the gear but which is thus automatically shaped to produce the correct form on the gear tooth.

2. A grinder as defined in claim 1 comprising means for adjusting said trimmer about an axis radial of the axis of said work support.

3. A gear grinder comprising a base, a work slide on said base, means for reciprocating said slide, a rotary work support on said slide having its axis of rotation parallel to the direction of reciprocation thereof, means for rotating said work support in timed relation to axial movement thereof, a wheel support, means on said wheel support mounting a wheel for rotation about its axis and for angular adjustment about an axis radial of the work support axis, a trimmer, means mounting said trimmer on said slide for movement therewith parallel to the axis of said slide and for rotation about the axis of rotation of said work support, means for rotating said trimmer in timed relation to movement of said slide parallel to the axis of said work support, said trimmer comprising a support spaced radially from the axis of said work support, a templet on said support, a block movable transversely between said templet and the peripheral portion of said wheel, an elongated element slidable in said block having a follower at one end movable over said templet, and a diamond at its other end movable over said wheel.

4. A helical gear grinder comprising a base, a rotary gear support, a rotary wheel support, a grinding wheel on said wheel support, means for effecting relative adjustment between said supports about an axis perpendicular to the axes of both of said supports, means for rotating said wheel support at grinding speeds, means for relatively moving said supports in a helical path about the axis of said gear support, a trimmer, means mounting said trimmer for relative helical movement with respect to said wheel about the axis of said gear support, a trimmer element carried by said trimmer and movable relative thereto in a predetermined path in a plane intersecting the adjacent edge portion of the wheel, means for guiding said trimmer element in a curved path in said plane corresponding to the transverse curvature of a tooth surface desired to be formed on a work gear by the grinding wheel, and means for adjusting said entire trimmer as a unit about an axis radial of the axis of the gear support to select the angle at which said plane intersects the axis of said work support.

5. A helical grinder comprising a base, a table reciprocable rectilinearly on said base, a rotary work support on said table having its axis of rotation parallel to the direction of reciprocation of said table, a rotary wheel support on said base, a grinding wheel on said wheel support, means for adjusting said wheel support about an axis perpendicular to axes of both supports, means for driving said wheel support at grinding speed, means for rotating said work support in timed relation to movement of said table, a wheel trimmer, means mounting said trimmer on said table for rotary movement about the axis of said work support, said trimmer having a trimming element movable relative thereto in a predetermined path in a plane intersecting the adjacent edge portion of the wheel, means for guiding said trimmer element in a curved path in said plane corresponding to the transverse curvature of a tooth surface desired to be formed on a work gear by the grinding wheel, means for effecting angular adjustment of said entire trimmer as a unit about an axis extending radially from the axis of said gear support toward said wheel support, and means for rotating said trimmer in timed relation to movement of said table in a direction parallel to the axis of said work support.

References Cited by the Examiner

UNITED STATES PATENTS

| | | | |
|---|---|---|---|
| 1,669,919 | 5/1928 | Trbojevich | 51—287 |
| 1,997,862 | 4/1935 | Halborg et al. | 125—11 |
| 2,066,220 | 12/1936 | Orcutt | 51—52 |
| 2,154,938 | 4/1939 | Hofer | 125—11 |
| 2,166,020 | 7/1939 | Philippe | 125—11 |
| 2,839,873 | 6/1958 | Baxter | 51—287 X |
| 3,067,733 | 12/1962 | Pernack et al. | 125—11 |

FOREIGN PATENTS 891,345   3/1962   Great Britain.

References Cited by the Applicant

FOREIGN PATENTS

| | | |
|---|---|---|
| 501,021 | 2/1939 | Great Britain. |
| 595,717 | 12/1947 | Great Britain. |
| 814,110 | 5/1959 | Great Britain. |
| 833,316 | 4/1960 | Great Britain. |

LESTER M. SWINGLE, *Primary Examiner.*